(12) United States Patent
Dubois et al.

(10) Patent No.: US 7,807,006 B2
(45) Date of Patent: Oct. 5, 2010

(54) PROCESS FOR MANUFACTURING A MULTILAYER PLASTIC FUEL TANK

(75) Inventors: Eric Dubois, Ciplet (BE); Dino Ferhatovic, Windsor (CA)

(73) Assignee: Inergy Automotive Systems Research (Société Anonyme) (BE)

( * ) Notice: Subject to any disclaimer, the term of this patent is extended or adjusted under 35 U.S.C. 154(b) by 961 days.

(21) Appl. No.: 10/550,176

(22) PCT Filed: Mar. 26, 2004

(86) PCT No.: PCT/EP2004/003616
§ 371 (c)(1),
(2), (4) Date: Jun. 13, 2006

(87) PCT Pub. No.: WO2004/085189
PCT Pub. Date: Oct. 7, 2004

(65) Prior Publication Data
US 2007/0029329 A1    Feb. 8, 2007

Related U.S. Application Data

(60) Provisional application No. 60/457,926, filed on Mar. 28, 2003.

(30) Foreign Application Priority Data
Jun. 2, 2003   (BE) ................................ 2003/0335

(51) Int. Cl.
B60K 15/03    (2006.01)
C23C 16/00    (2006.01)
B32B 27/00    (2006.01)

(52) U.S. Cl. .................. 156/242; 156/303.1; 156/308.2; 220/562

(58) Field of Classification Search ....................... None
See application file for complete search history.

(56) References Cited

U.S. PATENT DOCUMENTS

| 3,613,957 | A | * | 10/1971 | Walles ..................... 220/62.22 |
| 5,779,954 | A |   | 7/1998  | Tinant et al. |
| 6,269,802 | B1 |  | 8/2001  | Denis et al. |
| 2002/0195453 | A1 | | 12/2002 | McLeod |
| 2003/0044553 | A1 | | 3/2003 | Ramanathan et al. |
| 2003/0091741 | A1 | * | 5/2003 | Schmoyer .............. 427/255.28 |
| 2004/0071904 | A1 | * | 4/2004 | Short ......................... 428/35.7 |

FOREIGN PATENT DOCUMENTS

| DE | 42 29 717 | 3/1994 |
| EP | 0 732 363 | 9/1996 |
| FR | 2 747 175 | 10/1997 |

* cited by examiner

*Primary Examiner*—Richard Crispino
*Assistant Examiner*—Barbara J. Musser
(74) *Attorney, Agent, or Firm*—Connolly Bove Lodge & Hutz

(57) ABSTRACT

Multilayer plastic fuel tank, comprising a sulphonated part closing off an opening in the wall of the tank. The sulphonated part was manufactured independently of the tank. Process for manufacturing a tank comprising such a sulphonated part by molding a tank wall by blow molding or compression molding, the wall having an opening, and welding the sulphonated part to the wall of the tank surrounding the opening.

5 Claims, 1 Drawing Sheet

PROCESS FOR MANUFACTURING A MULTILAYER PLASTIC FUEL TANK

RELATED APPLICATIONS

This application is a national stage application (under 35 U.S.C. 371) of PCT/EP2004/003616 filed Mar. 26, 2004 which claims benefit to U.S. provisional application 60/457,926 filed Mar. 28, 2003 and Belgian application 2003/0335 filed Jun. 2, 2003.

The present invention relates to a multilayer plastic fuel tank.

Liquid and gas tanks for use in industry or on board vehicles of various kinds must generally meet sealing and permeability standards in relation to the type of usage for which they are designed and the environmental requirements with which they must comply. At the present time, both in Europe and throughout the world, there is a substantial tightening of the requirements relating to limiting pollutant emissions into the atmosphere and into the environment in general. As a consequence, the design of liquid and gas tanks is moving rapidly towards techniques capable of providing a better guarantee of sealing and of safety under various operating conditions. Moreover, manufacturers are also striving to reduce as far as possible the losses caused by various pipes and accessories connected to the tanks. One means sometimes used has been to incorporate certain accessories and pipes inside the tanks, thus eliminating their interface with the external environment.

Furthermore, tanks based on multilayer structures that include one or more layers of impermeable material have been used. The incorporation of accessories into such tanks poses the problem, so as to be able to insert accessories into these tanks, of how to seal and render impermeable the opening made therein. Moreover, the emissions coming from the accessories are of much greater relative importance with regard to multilayer tanks, the intrinsic permeability of which is substantially lower than that of conventional tanks.

European Patent EP-0 732 363-B1 teaches a process for the manufacture of a fuel tank having a low permeability to hydrocarbons and to alcohols by addition of a polyalkyleneimine to the plastic, sulphonation treatment of the internal wall of the reservoir by means of $SO_3$ and neutralization by means of a polyamine compound.

However, that process relates to the sulphonation treatment of the tank itself and does not disclose the treatment of accessories mounted thereon. Moreover, there is no mention in the patent EP-0 732 363-B1 of tanks with a multilayer structure.

DETAILED DESCRIPTION

Figure 1:
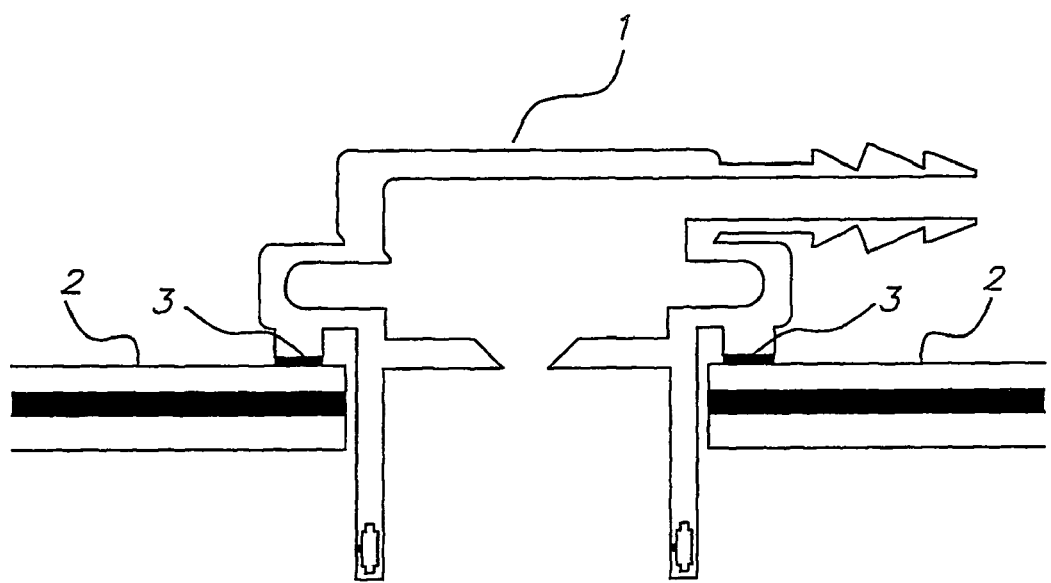
FIG. 1 illustrates an elevational view of a practice of this invention.

The object of the present invention is to provide a multilayer plastic fuel tank which includes plastic accessories but which nevertheless meets the most recent fuel emission standards.

For this purpose, the invention relates to a multilayer plastic fuel tank having at least one opening in its wall and at least one plastic part which closes off the opening, whereby the part is sulphonated over at least a portion in contact with the internal volume of the tank.

The term "fuel tank" is understood to mean a closed vessel designed to contain fuel, of various kinds, generally sealed with respect to the outside, which may be equipped with various internal accessories or with various accessories passing through the wall of the vessel. The fuel tank may be a gas tank, a liquid tank or a tank designed to contain both a gas and a liquid. Preferably, it is a liquid fuel tank or a liquid fuel tank also containing a gas phase consisting of fuel vapours, possibly mixed with air.

The term "fuel" denotes here any type of fuel that can be used in internal combustion engines and in fuel cells. In particular, it denotes hydrocarbons and alcohols containing less than 10 carbon atoms, and mixtures thereof.

The fuel tank according to the invention is a plastic fuel tank. The term "plastic" is understood to mean any synthetic polymer material, whether thermoplastic or thermosetting, which is in the solid state under-ambient conditions, as well as blends of at least two of these materials. The intended polymers comprise both homopolymers and copolymers (especially binary or ternary copolymers). Examples of such copolymers are, non-limitingly: random copolymers, linear block copolymers and other block copolymers, and graft copolymers. Thermoplastic polymers, including thermoplastic elastomers, are preferred.

The plastic fuel tanks according to the invention are in the form of tanks. having a multilayer structure. Tanks comprising at least one high-density polyethylene (HDPE) layer are preferred Particularly preferred tanks are those whose structure furthermore includes at least one internal layer made of a barrier material, that is to say a material, generally polymeric in nature, which possesses a very high impermeability to certain liquids and gases.

For example, use may be made of known barrier compositions such as those used to make fuel tanks impermeable. Examples of such barrier compositions are, non-limitingly: resins based on polyamides or copolyamides, random ethylene/vinyl alcohol copolymers (EVOH) or thermotropic liquid-crystal polymers (LCP), such as copolyesters of p-hydroxybenzoic acid and 6-hydroxy-2-naphthoic acid and copolyesters of p-hydroxybenzoic acid with terephthalic and 4,4' biphenol (for example the copolyesters sold under the brand names VECTRA® and XYDAR®.

The fuel tanks according to the invention have one or more openings, that is to say a cut of circular or non-circular shape, through the wall of the tank, present for various reasons. One example of these reasons is, for example, to be able to introduce, at least in part, one or more accessories into the tank that it is not possible to incorporate thereinto during its manufacture.

Before being able to use the fuel tank for its normal use of liquid and gas storage and confinement, it is therefore necessary to design and fit a closure system which is capable, after at least one portion of the accessory has been introduced, of hermetically sealing the tank as far as possible.

According to the invention, at least one plastic part closes off the opening in the wall of the tank. Preferably, a single part closes off each opening in the tank.

The part closing off the opening is sulphonated, that is to say that, prior to its incorporation into the tank according to the invention, for example during its manufacture, it has undergone a sulphonation treatment by means of sulphur trioxide.

According to the invention, the part is sulphonated over at least a portion in contact with the internal volume of the tank. Most often, this part is sulphonated over its entire portion that is in contact with the liquid and/or gaseous fuel which may occupy the internal volume of the tank. The part may also advantageously be sulphonated over its entire external surface.

The plastic part which closes off the opening in the wall of the tank according to the invention may have been produced by various forming techniques, well known per se.

Preferably, this part is selected from injection-moulded parts, extruded parts, blow-moulded parts and compression-moulded parts.

According to an advantageous embodiment of the invention, the part contains, at least in its sulphonated portion, at least 0.1% by weight of a polyalkyleneimine with respect to the total material of the sulphonated portion of the part. Several different polyalkyleneimines may also be used as a blend in the sulphonated part.

Preferably, the polyalkylene group comprises an alkylene unit containing from 1 to 5 carbon atoms. Homopolymers or copolymers of alkyleneimine units are equally suitable. These polymers may be unsubstituted, branched or linear. They may also be substituted on at least some of the imine functions with alkyl or acyl groups. The average molecular mass of these polyakyleneimines may generally vary from 300 to 1,000,000. Preferably, this average molecular mass is at least 1000. Excellent results have been obtained with polyethyleneimine.

The polyalkyleimine may be dispersed through the mass of the part when the latter is sulphonated over its entire surface area. It may also be dispersed only in that portion of the part which has been sulphonated, when this part is sulphonated only over a portion corresponding to only a portion of its surface.

According to a preferred embodiment of the tank according to the invention, the part is an accessory of the fuel tank. The term "accessory" is understood to mean in general any device through which the liquid or gaseous fuel passes or which is in contact with the liquid or gaseous fuel and which fulfils a particular function specific to the fuel system of which the tank forms part, including a function of transporting liquid and/or gas between two other devices.

Examples of such accessories are, non-limitingly: closure plates, tank venting and/or shut-off valves, delivery tubes for the flow of gas and/or liquid, connecters for at least an electrical cable and/or at least an optical fibre, connection sockets for pump-gauge modules, filling necks, safety valves and auxiliary additive tanks.

The tank according to the invention is very particularly suitable for being mounted on a motor vehicle. The term "motor vehicle" is understood to mean both cars, lorries and motor cycles.

The invention also relates to a process for manufacturing a multilayer plastic fuel tank comprising at least one opening in its wall and at least one plastic part which closes off the opening, whereby the following steps are carried out, in the order indicated:
a) at least a portion of the wall of the tank is manufactured using a moulding technique, comprising at least one operation chosen from blow moulding and compression moulding;
b) the opening is closed off by means of a sulphonated plastic part; and
c) the part closing off the opening is fastened to the wall of the tank.

In this process, the common terms have the same meaning as those given above in the description of the tank.

The opening in the wall of the tank may have been produced during the step of manufacturing this wall. Alternatively, it may have been made after this wall has been manufactured, in a subsequent machining step.

In a preferred method of implementing the process according to the invention, the part is fastened to the wall of the tank by welding. Preferably, the part is welded to the outer wall of the tank.

According to one particular method of implementing the process according to the invention, the sulphonated part was manufactured beforehand in three steps consisting, in order, of:
a) a first step of moulding a plastic comprising, at least in a portion of the part, at least 0.1% by weight of at least only polyalkyleneimine with respect to the total material of the sulphonated portion of the part;
b) a step of sulphonating at least that portion of the part in contact with the gaseous or liquid $SO_3$; and
c) a final step of rinsing followed by neutralization of at least the contact-sulphonated portion of the part by means of an alkaline solution.

The step of moulding the part may be carried out by any technique known per se. The polyalkyleneimine is dispersed in at least a portion of the plastic of the part at this moulding step. A masterbatch having a high polyalkyleneimine concentration in the plastic may be prepared in order to make it easier to meter the polyalkyleneimine into at least that portion of the part intended to be sulphonated and to improve the homogeneity of the polyalkyleneimine therein. Suitable quantities of this masterbatch may then be mixed with the plastic of that part intended to be sulphonated during the moulding operation.

According to a preferred method of implementing the process according to the invention, the operation of moulding the part is selected from injection moulding, extrusion, blow moulding and compression moulding operations.

The sulphonation step is carried out by means of gaseous or liquid sulphur trioxide. To manufacture the sulphur trioxide, it may be advantageous to bubble nitrogen through an oleum.

The sulphonated part used in the process according to the invention is a part that has been sulphonated outside this process, independently of the latter. It has undergone, prior to its use, for example during its manufacture, a sulphonation treatment by means of sulphur trioxide.

The rinsing step is generally carried out with water. Demineralized water has given good results.

After rinsing, the sulphonated part is neutralized by means of an aqueous alkaline solution. The aqueous alkaline solution comprises at least one alkaline reactant. Ammonia may be used as alkaline reactant. Preferably, at least one polyamine is used as alkaline reactant in the neutralization solution.

The term "polyamine" is understood to mean a compound which contains at least two amine functional groups. Polyalkylenepolyamines are particularly suitable. Good results have been obtained with triethylenetetramine.

As a variant, a polyamine from the family of alkylenepolyamines may also be used. Ethylenediamene has given good results.

Another preferred alkaline reactant belongs to the family of polyalkyleneimines. The polyalkyleneimines that may be suitable may be unsubstituted, consisting of linear or branched chains. These polyalkyleneimines may equally well be homopolymers or copolymers. They may be substituted with acyl or alkyl groups on the imine functional groups. Their average molecular mass may generally vary from 300 to 1,000,000. Preferably, their average molecular mass is at least 1000. Polyethyleneimine has given excellent results as alkaline neutralization reactant.

Alternatively, it is also possible to use as neutralization reactant an aqueous solution comprising a mixture of one or more of the abovementioned alkaline reactants.

During the neutralization step, the alkaline component is generally present in the aqueous solution in an amount of less than 0.5 g/l of solution. Preferably, this compound is present in an amount of at least 1 g/l of solution. However, the concentration of this alkaline component does not in general exceed 200 g/l of solution. Preferably, this concentration does not exceed 100 g/l of solution. A 5 g/l polyethyleneimine concentration in water has given excellent results.

The neutralization operation may be carried out over a wide range of temperatures, for example from 0 to 100° C. Good results have been obtained at room temperature.

The duration of the neutralization step is in general from 1 to 30 minutes and depends on the concentration of alkaline reactant and on the temperature used. A time of 15 minutes at room temperature for a solution containing 5 g/l of polyethyleneimine has given excellent results.

After neutralization, the parts are dried, possibly after rinsing them with water.

The examples that follow are given so as to illustrate the invention, without wishing to restrict its scope.

Preparation of Sulphonated Plagues

A high-density polyethylene (HDPE) resin of FINACENE® 2245 brand was used to prepare a masterbatch comprising 3.2 g/100 g of mixture of polyethyleneimine of LUPASOL® WF brand. The masterbatch was prepared in a WERNER & PFLEIDERER® ZSK 40 corotating twin-screw mixing unit and extruded in the form of rods 3 mm in diameter which were cut into granules 3 mm in length.

7% by weight of the masterbatch were then mixed with 93% of the FINACENE® 2245 HDPE resin in a gravimetric mixer of the MAGUIRE® Weight Scale Blender brand.

The resulting compound was then injection moulded using an injection-moulding machine of the NESTAL® 60 brand at a speed of 80 mm/s for a hold pressure of 550 bar. The conditioning temperature of the barrel of the moulding machine was 240° C. This injection-moulding machine outputted into a mould for producing square plaques having sides of 120 mm and a thickness of 3 mm, the compound having been injected in the form of a film on one of the sides of the square.

A batch of 30 plaques was then sulphonated in a 6-inch-diameter laboratory tube reactor. The reactor and the plaques were firstly dried by flushing with dry nitrogen at 40° C. for 15 minutes. The stream of flushing nitrogen was then bubbled though an oleum (63 wt % solution of $SO_3$ in $H_2SO_4$), before being introduced into the reactor, firstly at a rate of about 200 l/min for about 4 minutes, until white smoke appeared, and then for 15 minutes at 20 l/min.

Next, the reactor was flushed for 15 minutes with dry nitrogen in order to remove the $SO_3$ vapours, after which the plaques were removed from the reactor and rinsed by means of a demineralized water spray.

The plaques were then neutralized by immersing them in an
  aqueous 5 g/l LUPASOL® WF polyethyleneimine solution for 15 minutes.

The plaques were then removed from the reactor and dried in the open air.

Measurement of the Permeability of the Sulphonated Plaques

Each plaque was placed on an open face of a parallelepipedal steel cell provided with a liquid inlet line and filled to half its volume with a mixture comprising, by volume, 90% of a fuel of the HALTERMANN® RF02-99 brand and 10% analytical grade ethanol. A fluoropolymer seal was interposed between the plaque and the cell, which were held together by bolts.

The test consisted in closing the inlet line of the cell half-filled with the petro/ethanol fuel mixture and turning it upside down so that the liquid fuel comes into direct contact with the plate. After having conditioned the whole assembly at 40° C. for 1 week, the permeability of the plaque was then measured, on the basis of the SAE 2000-01-96 standard, be determining its weight loss once every week until a steady loss regime was obtained. Next, a straight line of the weight loss obtained by linear regression was plotted over this stable period and the permeability of the plaque was expressed in mg of fuel per day per $m^2$.

It was thus found that the sulphonated plaques had a permeability of 20 to 40 mg of fuel per day per $m^2$ at 40° C. The same permeability measurement on a plaque not having undergone the sulphonation treatment gave 28,000 mg of fuel per day per $m^2$ at 40° C.

Sulphonation of the Upper Portions of Venting Valves Intended to be Welded to a Tank Wall Opening A polyethyleneimine masterbatch comprising 3 g/100 g of polyethyleneimine mixture in a HDPE resin was prepared according to the same operating method as in the case of the preparation of the sulphonated plaques, except that the HDPE employed was LUPOLEN® 4261A polyethylene as replacement of the FINACENE® 2245 polyethylene.

After mechanically mixing 7% by weight of the masterbatch with 93% of LUPOLEN® 4261A resin, the material was injection moulded in an injection-moulding machine in the plant of a standard valve manufacturer. The upper parts of the valves were then preheated to 76° C. for 1 hour and sulphonated in a 110-mm-diameter PVC tube reactor in an amount of 10 upper parts of valves per batch by flushing with a 25 vol % mixture of gaseous $SO_3$ in dry nitrogen, obtained beforehand by expansion and mixing of the two gases coming from liquefied gas bottles. The flushing was carried out for 15 minutes and then the valve parts were neutralized by flushing the reactor with a 34.8 mol % aqueous $NH_3$ solution until complete neutralization of the residual $SO_3$.

The valve parts were then removed from the reactor, rinsed in demineralized water and dried in the open air.

Measurement of the Permeability of the Upper Parts of the Sulphonated Valves

The upper valve parts (1) were welded to the wall opening (2) of an HDPE/EVOH/HDPE three-layer tank as indicated in FIG. 1. To obtain a high quality weld, the weld edges (3) were machined so as to remove the sulphonated upper surface over a depth of 1 mm.

The upper valve parts (1) welded to the wall opening (2) were conditioned for 20 weeks at 40° C. by immersion in a CE-10-type fuel produced by Phillips Chemicals, comprising a mixture of 90 vol % C standardized fuel (ASTM D471 standard) and 10 vol % ethanol.

The permeability of the valve parts was then measured in a SHED (Sealed Housing for Evaporative Determination)-type enclosure according to the protocol standardized by the California Air Resource Board and the Environmental Protection Agency under No. 40 CFR 86.117-96 with 24-hour day/night cycles and the same fuel of the CE-10 type as that used for the immersion conditioning.

The measured permeability was about 15 mg of fuel per 24 hours. The same upper valve part, but not sulphonated, gave a permeability result of 30 to 50 mg of fuel per 24 hours.

The invention claimed is:

1. A process for manufacturing a multilayer plastic fuel tank comprising at least one opening in its wall, closed off by a sulphonated plastic part, wherein the following steps are carried out, in the order indicated:
   a) at least a portion of the wall of the tank is manufactured using a moulding technique, comprising at least one operation chosen from blow moulding and compression moulding;
   b) the opening is closed off by means of a sulphonated plastic part which is sulphonated over its entire surface; and
   c) the part closing off the opening is welded to the wall of the tank and
      wherein the portions of the sulphonated plastic part which are welded to the wall of the tank are machined prior to said welding so as to substantially remove a sulphonated upper surface from the portions welded to the wall.

2. The process according to claim 1, wherein the sulphonated part was manufactured beforehand in three steps consisting, in order, of:
   a) a first step of moulding a plastic comprising, at least in a portion of the part, at least 0.1% by weight of polyalkyleneimine with respect to the total material of the sulphonated portion of the part;
   b) a step of sulphonating at least that portion of the part in contact with the gaseous or liquid $SO_3$; and
   c) a final step of rinsing followed by neutralization of at least the contact-sulphonated portion of the part by means of an alkaline solution.

3. The process according to claim 2, wherein the moulding operation is selected from injection moulding, extrusion, blow moulding and compression moulding.

4. The process according to claim 1, wherein the part is an accessory of the fuel tank.

5. The process according to claim 4, wherein the accessory is chosen from closure plates, tank venting and/or shut-off valves, delivery tubes for the flow of gas and/or liquid, connecters for at least an electrical cable and/or at least an optical fibre, connection sockets for pump-gauge modules, filling necks, safety valves and auxiliary additive tanks.

* * * * *